Figure 1:
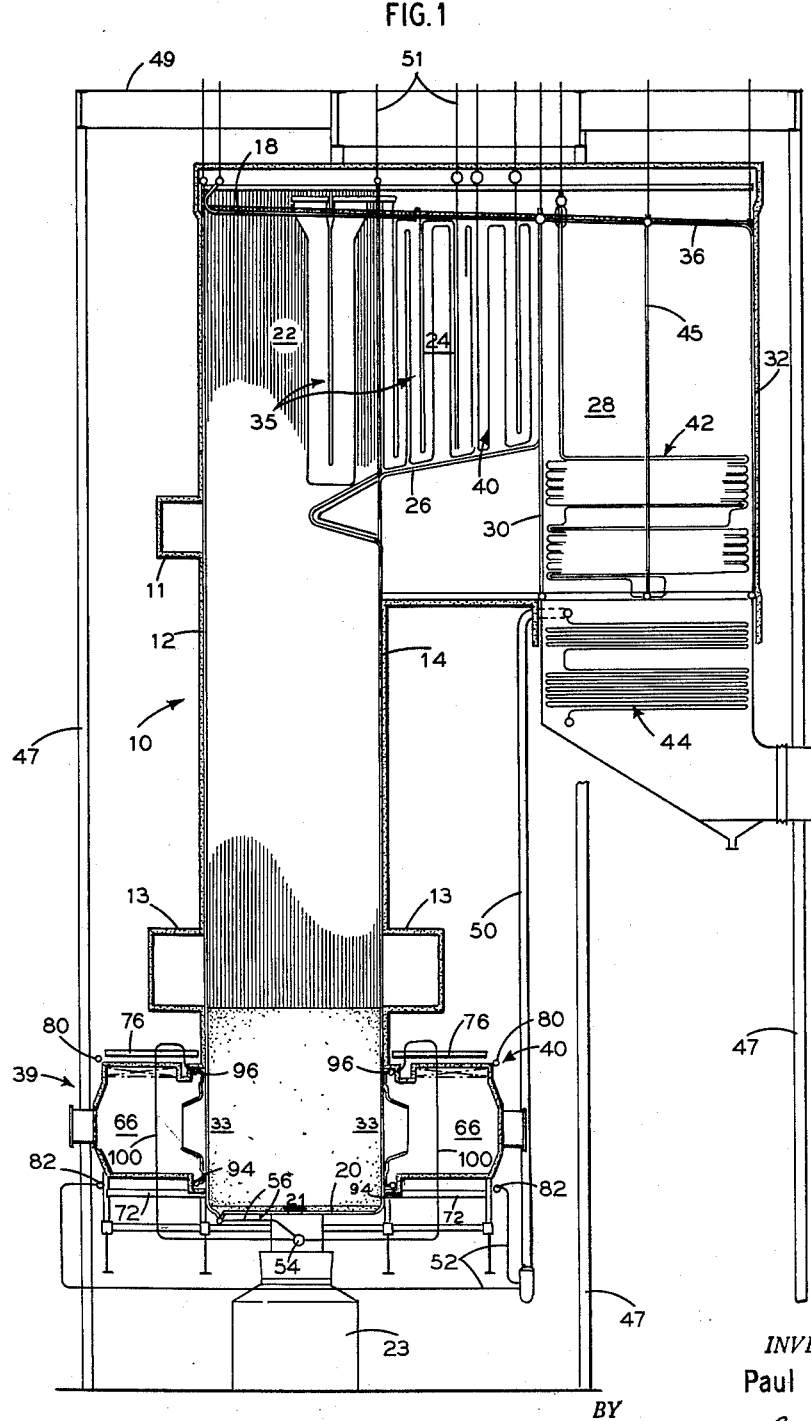

March 19, 1963 P. H. KOCH 3,081,748
FORCED FLOW FLUID HEATING UNIT
Filed Dec. 19, 1958 4 Sheets-Sheet 1

INVENTOR.
Paul H. Koch
BY
ATTORNEY

March 19, 1963 P. H. KOCH 3,081,748
FORCED FLOW FLUID HEATING UNIT
Filed Dec. 19, 1958 4 Sheets-Sheet 3
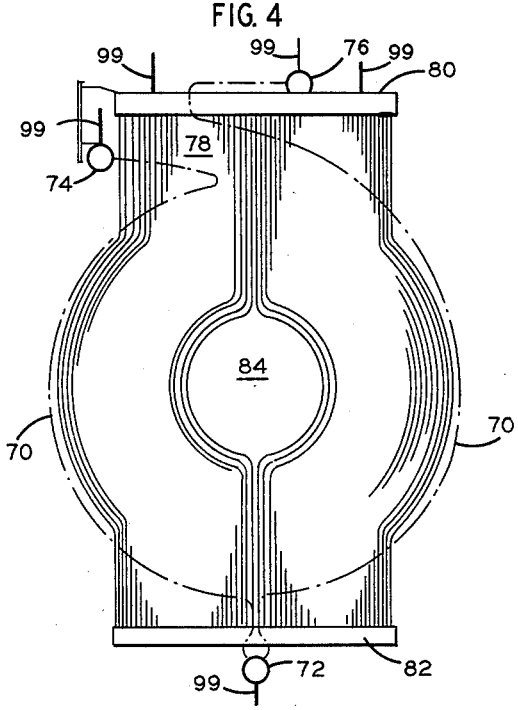
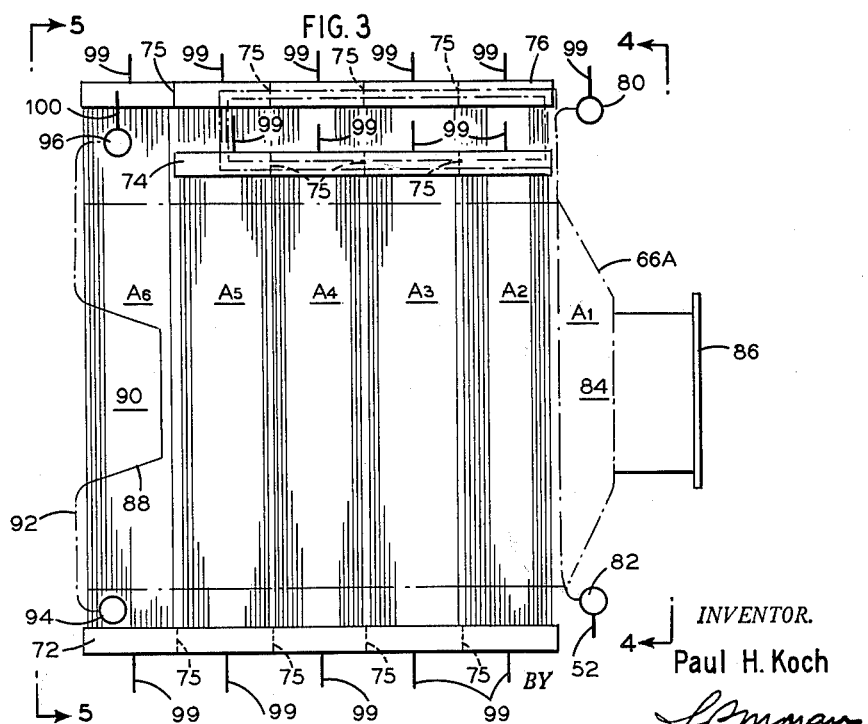
INVENTOR.
Paul H. Koch
ATTORNEY

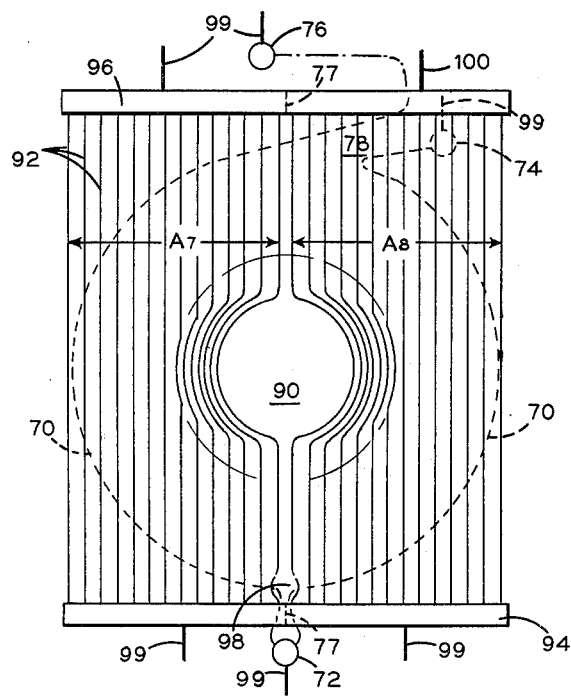

United States Patent Office 3,081,748
Patented Mar. 19, 1963

3,081,748
FORCED FLOW FLUID HEATING UNIT
Paul H. Koch, Akron, Ohio, assignor to The Babcock & Wilcox Company, New York, N.Y., a corporation of New Jersey
Filed Dec. 19, 1958, Ser. No. 781,576
12 Claims. (Cl. 122—406)

This invention relates in general to forced flow fluid heating units and more particularly to improvements in the construction and arrangement of the fluid heating circuits of cyclone type furnaces adapted for use in a forced circulation once-through vapor generating and superheating unit.

Specifically, the invention is directed to improvements in the construction and arrangement of fluid heating circuits of a forced flow vapor generator of the type described in the copending application of W. H. Rowand and D. C. Braddy, Serial No. 364,378, filed June 26, 1953, which is now U.S. Patent No. 2,902,982, wherein the vapor generator is fired by a plurality of cyclone furnaces, all the feedwater is supplied to one of the cyclone furnaces, and the cyclone furnaces are so connected that the feedwater passes serially through the circumferential and gas discharge end wall tube panels of successive cyclone furnaces, with the gas discharge end wall of each cyclone furnace formed by fluid heating tubes of a boundary wall of an upright chamber commonly supplied with heating gases from the cyclone furnaces.

In accordance with the present invention the forced circulation fluid heating unit is provided with a plurality of cyclone furnaces arranged to discharge the products of combustion generated therein into an upright furnace chamber formed by walls including fluid heating tubes, with each cyclone furnace having its circumferential and gas discharge end walls lined or formed by a plurality of tube panels. The tube panels of the cyclone furnaces are constructed and arranged so that the fluid to be heated is supplied in parallel flow relation to one of the tube panels of the circumferential wall of each cyclone furnace and so that the fluid discharging from correspondingly located tube panels of each cyclone furnace flows in series to the next adjacent tube panel in the direction of the gas outlet of another of the cyclone furnaces, with the fluid heating circuit of the gas discharge end wall of each cyclone furnace separate from and connected for series flow of fluid to the fluid heating tubes of the boundary walls of the upright furnace chamber. With the fluid heating surface of the boundary walls of the cyclone furnaces so arranged distribution of flow is at an optimum; the fluid temperatures in the walls of each cyclone furnace gradually increase from front to rear; the maximum temperature differential between adjacent tubes of each cyclone furnace and of the wall of the upright chamber to which the cyclone furnace is attached is below a predetermined critical limit, thereby maintaining differential expansion in the walls within safe limits; fluid flow unbalances in the tubes of the cyclone furnaces are minimized; and the fluid temperatures leaving the cyclone furnaces are uniform regardless of the number in operation.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred form of the invention.

Figure 2:
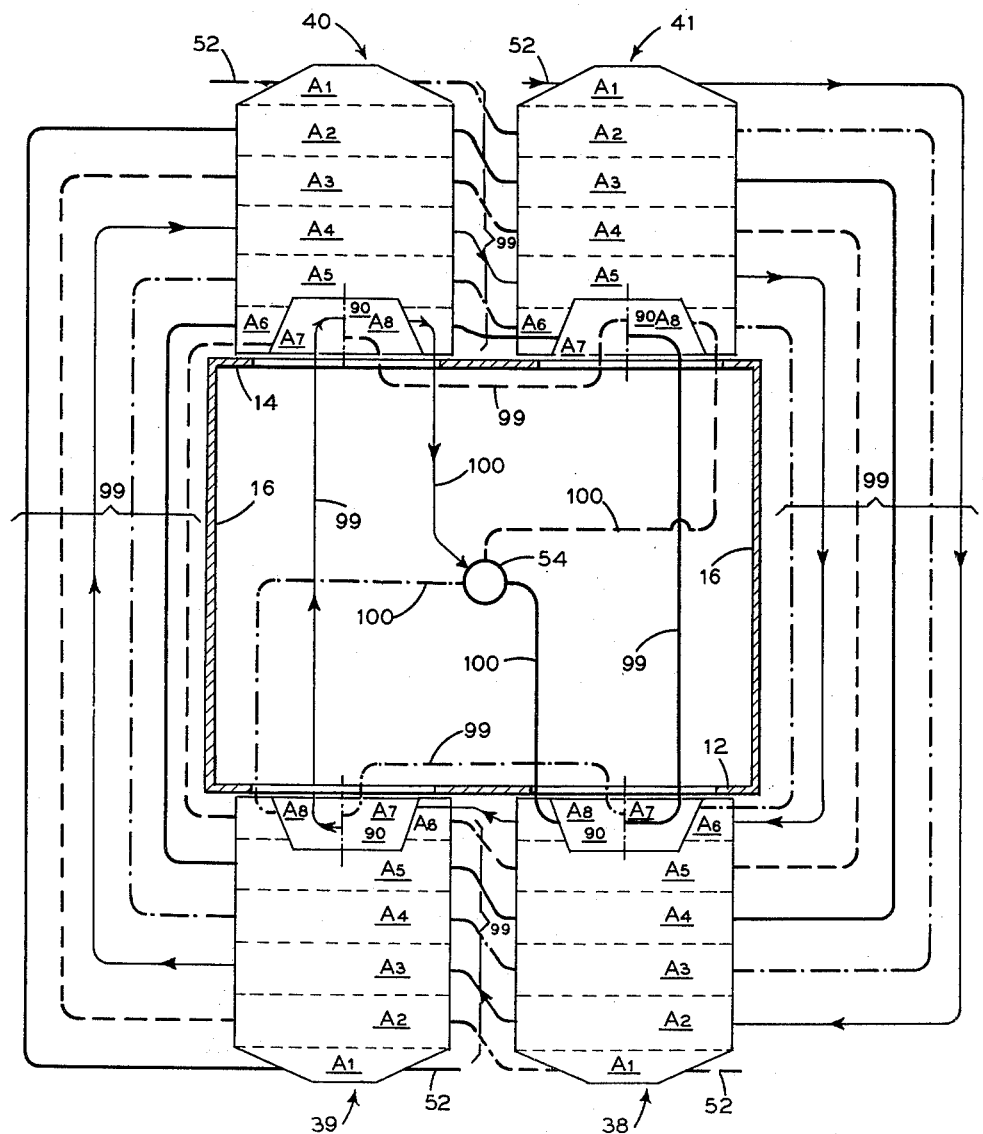

Of the drawings:
FIG. 1 is a partially diagrammatic sectional elevation of a once-through forced flow steam generator embodying the invention;
FIG. 2 is a diagrammatic representation of the vaporizable fluid flow path within the cyclone furnaces of FIG. 1;
FIG. 3 is a sectional side view of one of the cyclone furnaces shown in FIG. 1;
FIG. 4 is a sectional view taken along the line 4—4 of FIG. 3; and
FIG. 5 is a sectional view taken along the line 5—5 of FIG. 3.

In the drawings the invention has been illustrated as embodied in a top-supported forced flow once-through steam generating unit intended for central station use. The particular unit illustrated is designed on coal firing for a maximum continuous steam output of 1,362,000 lbs. of steam per hour at a pressure of 2475 p.s.i. and a total temperature of 1050° F. at the superheater outlet, based on feedwater being supplied at a temperature of 480° F.; and a maximum continuous steam output of 1,034,000 lbs. of steam per hour at a pressure of 561 p.s.i. at a total temperature of 1000° F. at the reheater outlet. While the fluid heating unit illustrated and hereinafter described is specifically designed and particularly adapted for the production of superheated steam at pressures and temperatures below the critical pressure of 3206 p.s.i. and the critical temperature of 705° F., it will be understood that the fluid heating unit illustrated may be adapted for operation at supercritical pressures and temperatures.

The main portions of the unit illustrated include an upright furnace chamber 10 of substantially rectangular horizontal cross-section defined by front 12, rear 14 and side walls 16, a roof 18, and a floor 20 and having a gas outlet 22 at its upper end opening to a horizontally extending gas pass 24 of rectangular vertical cross-section formed by extensions of the furnace roof 18 and side walls 16 and a floor 26. The boundary walls of the furnace chamber 10 are formed by insulation covered metallic casing lined by fluid heating tubes secured thereto. The gas pass 24 communicates at its rear end with the upper end of an upright gas passage 28 of rectangular horizontal cross-section defined by a front wall 30, a rear wall 32, side walls (not shown) and a roof 36. The fuel firing section consists of four independently operable horizontally extending cyclone type furnaces 38, 39, 40 and 41 of relatively small volume and boundary wall area disposed in pairs at the same level on opposite walls 12 and 14 at the lower portion of the furnace chamber 10. Each cyclone furnace is arranged to burn solid fuel at high rates of heat release and to separately discharge high temperature gaseous products of combustion and separated ash residue as a molten slag into the lower portion of the chamber 10 through openings 33 in the corresponding boundary wall thereof. The floor 20 is formed with a plurality of transversely spaced openings 21 for the discharge of molten slag to a slag tank 23. The gas pass 24 is occupied by a secondary superheater 35 and a reheater 40 arranged in series with respect to gas flow and each comprising vertically extending nested multiple-looped tubes, with the tubes of the secondary superheater being arranged so that the vapor flows first in parallel flow heat transfer relation with the gases flowing through the gas pass 24 and then in counterflow heat transfer relation and with the tubes of the reheater being arranged so that the vapor flows in counterflow relation with the gases. The gas passage 28 is occupied by a primary superheater 42 and an economizer 44 arranged in series with respect to gas flow. The primary superheater comprises horizontally extending nested multiple-looped tubes arranged for vapor flow in counterflow relation with the heating gases and top-supported by a row of vertically extending fluid heating tubes 45. The economizer comprises horizontally extending multiple-looped tubes arranged for liquid flow in counterflow heat transfer relation with the gases. The heating gases from the gas passage 28 flow to an airheater, not shown, then pass through an induced draft fan to the stack. A portion of the relatively cool gases leaving the airheater are recycled by a gas recirculating fan, not shown, to the upper and lower portions of the chamber 10 by way of ducts 11 and 13, respectively, and suitable openings formed in the boundary walls of the chamber 10.

The vapor generator is top-supported by structural steel members including upright members 47 and cross beams 49 from which hangers 51, of which only a few are illustrated, support most of the pressure parts.

Feedwater at a pressure of 3070 p.s.i.g. is supplied by a feed pump, not shown, to the economizer 44 wherein it is partially heated. From the economizer the fluid flows through a downcomer 50 and supply tubes 52 to the cyclone furnace fluid heating circuits, which will be hereinafter described, then passes through a horizontally arranged fluid mixing and distribution header 54 and supply tubes 56 to the inlet headers for the fluid heating tubes lining the front, rear and side walls of the furnace 10.

The boundary walls of the furnace chamber 10, the gas pass 24 and the upright gas passage 28 are lined by fluid heating tubes constructed and arranged so that the fluid from the mixing header 54 flows in parallel through the radiant heat absorbing tubes of the front, rear and side walls of the furnace 10; then through the tubes forming the roof of the furnace 10 and the gas pass 24; then in parallel through the convection heat absorbing fluid heating tubes of the side walls of the gas pass 24, the boundary walls of the gas passage 28 and the support tubes 45; then successively passes through the primary superheater 42 and the secondary superheater 35 and then flows to the high pressure stage of a vapor turbine, not shown. Partially expanded steam from the turbine passes to the reheater 40, from which it returns to the turbine for final expansion.

In accordance with the invention each cyclone furnace comprises a substantially cylindrical combustion chamber 66 arranged with its major axis horizontal and having a frusto-conical extension 66A at the front, or outer end thereof, the circular boundary wall being formed by insulation covered metallic casing connected to the corresponding boundary wall of the furnace chamber 10 and lined by oppositely arranged groups of refractory covered closely spaced studded tubes 70. The tubes 70 along one side of the circumferential wall of the cylindrical portion of each combustion chamber have their inlet ends connected to a horizontal subdivided lower header 72 and their discharge ends connected to a horizontal subdivided upper header 74 and the tubes 70 along the opposite side have their inlet ends connected to the header 72 and their discharge ends connected to a horizontal subdivided upper header 76. The upper and lower ends of each tube 70 of the cylindrical portion of each combustion chamber are reversely bent, and have opposite tubes at the top of the chamber spaced apart to form a tangentially arranged combustion air inlet 78 extending over a major portion of the length of the chamber and connected to an air supply duct, not shown. The tubes 70 along both sides of the circumferential wall of the frusto-conical portion 66A of the combustion chamber extend between horizontally arranged top and bottom headers 80 and 82, respectively, to form a tube panel $A_1$, and have their intermediate portions curved to define a circular fuel inlet port 84. A fuel inlet casing 86 of logarithmically curved peripheral formation registers with the port 84 and is arranged to discharge a whirling stream of primary combustion air and crushed coal through the port 84. The rear end of each combustion chamber is formed by a vertical wall positioned outside of and suitably connected to the corresponding boundary wall tubes of the furnace chamber 10 and having a flaring re-entrant throat 88 forming a gas outlet 90 communicating with the corresponding opening 33 of the furnace chamber 10. The wall and throat are formed by refractory covered closely spaced studded tubes 92 extending between horizontal subdivided lower and upper headers 94 and 96, respectively, with intermediate portions of certain tubes bent to form the throat and an opening 98 in the wall adjacent the bottom of the combustion chamber for the discharge of molten slag through the corresponding opening 33 into the furnace chamber.

As indicated in FIGS. 1 and 3, the fluid supply headers 82 for the panels $A_1$ of the combustion chambers are connected for parallel flow of fluid from the downcomer 50 leading from the economizer 44 by the supply tubes 52. The headers 72, 74 and 76 of each combustion chamber are subdivided by transverse internal diaphragms 75 to group the wall tubes 70 into similar adjoining panels $A_2$, $A_3$, $A_4$, $A_5$ and $A_6$. The rear end wall headers 94 and 96 of each combustion chamber are also subdivided by transverse internal diaphragms 77 to group the wall tubes 92 into similar adjoining tube panels $A_7$ and $A_8$ on opposite sides of the vertical centerline of the wall. The outlet header of correspondingly located tube panels of each combustion chamber are connected by tubes 99 for flow of fluid to the inlet header of the next adjacent tube panel in the direction of the gas outlet of the next adjacent combustion chamber in a clockwise direction. For the sake of clarity, FIG. 2 diagrammatically shows the flow path of the vaporizable fluid to, through and from the cyclone furnaces. In operation the high pressure fluid from the downcomer 50 flows in parallel to the tube panels $A_1$ by way of the supply tubes 52. One of the parallel flow streams successively passes through panel $A_1$ of furnace 38, panel $A_2$ of furnace 39, panel $A_3$ of furnace 40, panel $A_4$ of furnace 41, panel $A_5$ of furnace 38, panel $A_6$ of furnace 39, and panel $A_7$ of furnace 40 to panel $A_8$ of furnace 41, then flows through panel $A_8$ and tubes 100 to the mixing header 54. Another of the parallel flow streams successively passes through panel $A_1$ of furnace 39, panel $A_2$ of furnace 40, panel $A_3$ of furnace 41, panel $A_4$ of furnace 38, panel $A_5$ of furnace 39, panel $A_6$ of furnace 40, and panel $A_7$ of furnace 41 to panel $A_8$ of furnace 38, then flows through panel $A_8$ and tubes 100 to the mixing header 54. The flow path of each of the parallel flow streams passing to the panels $A_1$ of the furnaces 40 and 41 is of the same character as those described for the streams passing to the panels $A_1$ of the furnaces 38 and 39. The tube panels of the cyclone furnaces are so proportioned and arranged that the contained water is heated under maximum load conditions to a temperature approaching, but still below, the saturated temperature corresponding to the pressure in the outlet headers 96; that the maximum temperature differential between adjacent tubes is below a predetermined critical limit, thereby maintaining differential expansions in the walls within safe limits; that fluid flow unbalances in the tubes are minimized; that the tube surfaces of panels in different zones of heat intensity in the cyclone furnaces are sufficient in quantity to carry away the heat at a rate adequate to prevent over-heating of the tubes; that heat distribution unbalances to the tubes are minimized; and that the tubes are of sufficient inside diameter to provide adequate fluid circulation velocities. With the tube panels of the combustion chambers interconnected as described, each of the parallel flow streams entering the panels $A_1$ passes successively through tube panels of all the combustion chambers and in a path winding nearer to the gas discharge end of the combustion chambers as it makes two separate passes through each combustion chamber. Thus each parallel stream enters the tube panel $A_1$ of one combustion chamber and discharges from the tube panel $A_8$ of another combustion chamber, while gradually increasing in temperature as it makes the circuit. Since the flow path of each of the parallel flow streams entering the panels $A_1$ is essentially the same, the temperature of the contained fluid of the tubes of each combustion chamber gradually increases from the front to the rear or gas outlet end thereof and the fluid temperatures leaving the panels $A_8$ are substantially uniform regardless of the number of cyclone furnaces in operation. The header 54 is provided to receive and mix the fluid discharged from each of the panels $A_8$ and flow the mixed fluid to the boundary wall tubes of the chamber 10, thereby assuring that the distribution of the fluid to these tubes will be uniform. The tubular surfaces of the unit are proportioned and arranged so that the portion of the heated fluid circuit in which the transition of the water from a liquid to a vapor condition occurs will always be located in the upper portions of the boundary wall tubes of the chamber 10. Because of the uniform temperature and distribution of the fluid entering the boundary wall tubes of the chamber 10 and because the temperature of the fluid is no greater than the saturated temperature as it flows through the portion of the boundary wall tubes of the chamber 10 adjoining the tubes forming the gas discharge end walls of the cyclone furnaces; the maximum differential temperature between adjacent tubes of the boundary walls of the chamber 10 and between adjacent wall tubes of the chamber 10 and the cyclone furnaces will be well below the limit beyond which undue thermal stresses on the wall-forming components of the cyclone furnaces and chamber 10 would be expected to occur. The fluid flow path beyond the fluid heating tubes of the boundary walls of the chamber 10 has been previously described.

In the normal operation of the fluid heating unit, primary air and a relatively coarse crushed fuel in suspension is supplied to the cyclone furnaces through the fuel inlets 86 from independently controllable sources and the fuel burned in the cyclone furnaces at high rates of heat release sufficient to maintain a normal mean temperature therein above the fuel ash fusion temperature. The secondary combustion air is supplied in quantities insuring substantially complete combustion of the fuel in the cyclone furnaces. The ash separates as a molten slag which flows through the outlets 98 into the lower portion of the chamber 10 and is discharged through the outlets 21 into the slag tank, while gases with a relatively small amount of slag particles in suspension discharge through the outlets 90 into the lower portion of the chamber 10. The gases then flow upwardly through the chamber 10 to the inlet of the gass pass 24. The tube portions lining the lower part of the enclosure walls of the chamber 10 are studded and covered with refractory to reduce the heat input thereto, to maintain temperatures in this chamber portion above the ash fusion temperature so that slag will continuously pass through the outlets 21 in a molten condition, and to withstand the high temperature conditions in this chamber portion.

Recirculated gases, taken from a position downstream of the economizer, are introduced into the upper and lower portions of the furnace chamber 10 by way of the ducts 11 and 13, respectively, for mixing with the fresh heating gases passing upwardly through the chamber 10. The recirculated gases are used primarily to prevent excessive furnace absorption, and thereby minimize fluid flow unbalances and fluid and/or metal temperature unbalances in the boundary wall tubes of the furnace chamber 10 and prevent high fluid and/or metal temperatures in these tubes. Furnace absorption is regulated by using recirculated gases as tempering control gases and as furnace absorption control gases. The tempering control gases are introduced into the chamber 10 at a level subjacent the gas outlet 22 and serve to reduce the temperature of the gases entering the secondary superheater 35 to a satisfactory level. In effect, gas tempering permits a reduction in the furnace size for any given exit gas temperature limit. The reduction in furnace size, of course, reduces the total furnace absorption. The furnace absorption control gases enter the furnace chamber 10 at a level superjacent the cyclone furnaces and serve to vary the furnace absorption to provide the necessary total available heat leaving the furnace to maintain the reheater final steam temperature constant over the load range. The final superheater outlet steam temperature is maintained constant over the load range by controlling the firing rate of the cyclone furnaces. The flow of tempering gases decreases from a maximum at full load to a minimum at some partial load, while the flow of furnace absorption control gases increases from a minimum at full load to a maximum at some partial load.

The heating gases discharge from the furnace chamber 10 at the desired temperature and heat content and then pass successively over and between the tubes of the secondary superheater 35 and reheater 40 in the gas pass 24 and over and between the tubes of the primary superheater 42 and economizer 41 in the gas pass 78, then flow through the airheater to the inducer draft fan from which they are discharged to the stack.

While in accordance with the provisions of the statutes I have illustrated and described herein the best form of the invention now known to me, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. In a forced circulation fluid heating unit, walls defining a plurality of separate combustion chambers each having a gas outlet, means for burning fuel at high rates of heat release in each of said combustion chambers, one of said walls of each combustion chamber including a plurality of side-by-side fluid heating tube panels subject only to the heating gases generated in the corresponding combustion chamber, means supplying fluid in parallel flow relation to one of the tube panels of each combustion chamber, and means including a fluid conduit outside of said combustion chambers connecting said one tube panel of each one of said combustion chambers for series flow of fluid to another of said tube panels of another of said combustion chambers.

2. In a forced circulation fluid heating unit, walls defining a plurality of separate combustion chambers of substantially circular cross-section each having a gas outlet, means for burning fuel at high rates of heat release in each of said combustion chambers, one of said walls of each combustion chamber including a plurality of fluid heating tube panels subject only to the heating gases generated in the corresponding combustion chamber, each tube panel comprising a plurality of tubes arranged for parallel flow of fluid therethrough, means supplying fluid in parallel flow relation to one of the tube panels of each combustion chamber, and means including a fluid conduit outside of said combustion chambers connecting said one tube panel of each one of said combustion chambers for series flow of fluid to another of said tube panels of another of said combustion chambers.

3. In a forced circulation once-through fluid heating unit, walls defining a plurality of separate combustion chambers, means for burning fuel at high rates of heat release in each of said combustion chambers, said walls of each combustion chamber including a circumferential wall and an end wall having a gas outlet formed therein, said circumferential and end walls of each combustion chamber including a plurality of fluid heating tube panels subject only to the heating gases generated in the corresponding combustion chamber, means supplying fluid in parallel flow relation to the tube panel of the circumferential wall of each combustion chamber farthest from the gas outlet thereof, and means including fluid conduits outside of said combustion chambers connecting each of correspondingly located tube panels of each combustion chamber for series flow of fluid to the next adjacent tube panel in the direction of the gas outlet of another of said combustion chambers.

4. In a forced circulation fluid heating unit, walls including fluid heating tubes defining a furnace chamber having a gas outlet, walls defining a plurality of separate combustion chambers each having a gas outlet opening to said furnace chamber, means for burning fuel at high rates of heat release in each of said combustion chambers, one of said walls of each combustion chamber including a plurality of fluid heating tube panels subject only to the heating gases generated in the corresponding combustion chamber, means supplying fluid in parallel flow relation to one of the tube panels of each combustion chamber, and means including at least one of the remaining tube panels of each combustion chamber and fluid conduit means outside of said combustion chambers connecting said one tube panel of each combustion chamber for series flow of fluid to the fluid heating tubes of at least one of the walls of said furnace chamber.

5. In a forced circulation fluid heating unit, walls including upwardly extending fluid heating tubes defining an upright furnace chamber having a gas outlet, walls defining a plurality of separate combustion chambers of substantially circular cross-section, means for burning fuel at high rates of heat release in each of said combustion chambers, said walls of each combustion chamber including a circumferential wall and an end wall adjoining the corresponding wall of said furnace chamber and having a gas outlet formed therein opening to said furnace chamber, said circumferential and end walls of each combustion chamber including a plurality of fluid heating tube panels subject only to the heating gases generated in the corresponding combustion chamber, each tube panel comprising a plurality of tubes arranged for parallel flow of fluid therethrough, means supplying fluid in parallel flow relation to one of the tube panels of the circumferential wall of each combustion chamber, means including at least one of the remaining tube panels of the circumferential wall of each combustion chamber and fluid conduit means outside of said combustion chambers connecting said one tube panel of each one of said combustion chambers for series flow of fluid to one of the tube panels of the end wall of another of said combustion chambers, and means connecting said one tube panel of the end wall of each of said other combustion chambers for series flow of fluid to the fluid heating tubes of the walls of said furnace chamber.

6. In a forced circulation fluid heating unit, walls including fluid heating tubes defining a furnace chamber having a gas outlet, walls defining a plurality of separate combustion chambers of substantially circular cross-section, means for burning fuel at high rates of heat release in each of said combustion chambers, said walls of each combustion chamber including a circumferential wall and an end wall having a gas outlet formed therein opening to said furnace chamber, said circumferential and end walls of each combustion chamber including a plurality of fluid heating tube panels subject only to the heating gases generated in the corresponding combustion chamber, means supplying fluid in parallel flow relation to the tube panel of the circumferential wall of each combustion chamber farthest from the gas outlet thereof, means including fluid conduits outside of said combustion chambers connecting each of correspondingly located tube panels of each combustion chamber for series flow of fluid to the next adjacent tube panel in the direction of the gas outlet of another of said combustion chambers, and means connecting one of the tube panels of the end wall of each combustion chamber for series flow of fluid to the fluid heating tubes of at least one of the walls of said furnace chamber.

7. In a forced circulaton once-through vapor generator, walls including upwardly extending radiant heat absorbing fluid heating tubes defining an upright furnace chamber having a gas outlet at its upper end, walls defining a plurality of substantially cylindrical separate combustion chambers, means for burning fuel at high rates of heat release in each of said combustion chambers, said walls of each combustion chamber including a circumferential wall and an end wall adjoining the corresponding wall of said furnace chamber and having an inwardly projecting throat forming a gas outlet surrounded by an annular pocket and opening to said furnace chamber, said circumferential and end walls of each combustion chamber including a plurality of fluid heating tube panels subject only to the heating gases generated in the corresponding combustion chamber, means supplying fluid in parallel flow relation to one of the tube panels of the circumferential wall of each combustion chamber, and means including at least one of the remaining tube panels of each combustion chamber and fluid conduit means outside of said combustion chambers connecting said one tube panel of each combustion chamber for series flow of fluid to the lower ends of the fluid heating tubes of at least one of the walls of said furnace chamber.

8. In a fluid heating unit having a forced circulation fluid circulation system, walls including fluid heating tubes defining a furnace chamber having a gas outlet, walls defining a plurality of separate combustion chambers of substantially circular cross-section each connected to said furnace chamber and having a gas outlet opening thereto, means for burning fuel at high rates of heat release in each of said combustion chambers, one of said walls of each combustion chamber including a plurality of laterally contiguous fluid heating tube panels subject only to the heating gases generated in the corresponding combustion chamber, each tube panel comprising a plurality of laterally adjacent tubes arranged for parallel flow of fluid therethrough, means supplying fluid in parallel flow relation to one of the tube panels of each combustion chamber, and means connecting said panels and furnace chamber wall tubes into said circulation system to provide a serial flow of fluid from each of said one panels of each combustion chamber through at least one other panel of each of successive combustion chambers and thence through the fluid heating tubes of at least one of the walls of said furnace chamber.

9. In a fluid heating unit having a forced circulation fluid circulation system, walls including fluid heating tubes defining a furnace chamber having a gas outlet, walls defining a plurality of separate combustion chambers of substantially circular cross-section each connected to said furnace chamber and having a gas outlet opening thereto, means for burning fuel at high rates of heat release in each of said combustion chambers, one of said walls of each combustion chamber including a plurality of laterally contiguous fluid heating tube panels subject only to the heating gases generated in the corresponding combustion chamber, each tube panel comprising a plurality of laterally adjacent tubes arranged for parallel flow of fluid therethrough, means supplying fluid in parallel flow relation to one of the tube panels of each combustion chamber, and means connecting said panels and furnace chamber wall tubes into said circulation system to provide a serial flow of fluid from each of said one panels of each combustion chamber through another panel of successive combustion chambers, and then successively through still another panel of each of the combustion chambers, and thence through the fluid heating tubes of at least one of the walls of said furnace chamber.

10. In a fluid heating unit having a forced circulation fluid circulation system, walls including fluid heating tubes defining a furnace chamber having a gas outlet, walls defining a plurality of separate combustion chambers of substantially circular cross-section, means for burning fuel at high rates of heat release in each of said combustion chambers, said walls of each combustion chamber including a circumferential wall and an end wall adjoining and connected to one of said walls of said furnace chamber and having a gas outlet formed therein opening to said furnace chamber, said circumferential and end walls of each combustion chamber including a plurality of contiguous fluid heating tube panels subject only to the heating gases generated in the corresponding combustion chamber, each tube panel comprising a plurality of laterally adjacent tubes arranged for parallel flow of fluid therethrough, means supplying fluid in parallel flow relation to one of the tube panels of the circumferential wall of each combustion chamber, and means connecting said panels and furnace chamber wall tubes into said circulation system to provide a serial flow of fluid from each of said one panels of each combustion chamber through at least one other panel of each of successive combustion chambers to the end wall panel of one of the combustion chambers and thence through the fluid heating tubes of at least one of the walls of said furnace chamber.

11. In a fluid heating unit having a forced circulation fluid circulation system, walls including fluid heating tubes defining a furnace chamber having a gas outlet, walls defining a plurality of separate combustion chambers of substantially circular cross-section, means for burning fuel at high rates of heat release in each of said combustion chambers, said walls of each combustion chamber including a circumferential wall and an end wall adjoining and connected to one of said walls of said furnace chamber and having a gas outlet formed therein opening to said furnace chamber, said circumferential and end walls of each combustion chamber including a plurality of contiguous fluid heating tube panels subject only to the heating gases generated in the corresponding combustion chamber, each tube panel comprising a plurality of laterally adjacent tubes arranged for parallel flow of fluid therethrough, means supplying fluid in parallel flow relation to the tube panel of the circumferential wall of each combustion chamber farthest from the gas outlet thereof, and means connecting said panels and furnace chamber wall tubes into said circulation system to provide a serial flow of fluid from each of said farthest tube panels of each combustion chamber through at least one other panel of each of successive combustion chambers to the end wall panel of one of the combustion chambers and thence through the fluid heating tubes of at least one of the walls of said furnace chamber, with correspondingly located tube panels of each combustion chamber being connected for series flow of fluid to the next adjacent panel in the direction of the gas outlet of the next successive combustion chamber.

12. In a fluid heating unit having a once-through forced circulation fluid circulation system, walls including fluid heating tubes defining a furnace chamber having a gas outlet, walls defining a plurality of separate combustion chambers of substantially circular cross-section, means for burning fuel at high rates of heat release in each of said combustion chambers, said walls of each combustion chamber including a circumferential wall and an end wall adjoining and connected to one of said walls of said furnace chamber and having a gas outlet formed therein opening to said furnace chamber, said circumferential and end walls of each combustion chamber including a plurality of contiguous fluid heating tube panels subject only to the heating gases generated in the corresponding combustion chamber, each tube panel comprising a plurality of laterally adjacent tubes arranged for parallel flow of fluid therethrough, means supplying fluid in parallel flow relation to the tube panel of the circumferential wall of each combustion chamber farthest from the gas outlet thereof, and means connecting said panels and furnace chamber wall tubes into said circulation system to provide a serial flow of fluid from each of said farthest tube panels of each combustion chamber through another panel of each of successive combustion chambers and then successively through still another panel of each of the combustion chambers, and thence through the fluid heating tubes of the walls of said furnace chamber, with correspondingly located tube panels of each combustion chamber being connected for series flow of fluid to the next adjacent panel in the direction of the gas outlet of the next successive combustion chamber.

References Cited in the file of this patent

UNITED STATES PATENTS

| | | |
|---|---|---|
| 2,752,898 | Troutman | July 3, 1956 |
| 2,774,339 | Junkermann | Dec. 18, 1956 |
| 2,797,667 | Patterson | July 2, 1957 |
| 2,800,114 | Kolling | July 23, 1957 |
| 2,902,982 | Rowand et al. | Sept. 8, 1959 |
| 2,918,798 | Schroder | Dec. 29, 1959 |

FOREIGN PATENTS

| | | |
|---|---|---|
| 762,902 | Great Britain | Dec. 5, 1956 |
| 762,940 | Great Britain | Dec. 5, 1956 |